T. A. BOWERS.
WIRE WHEEL.
APPLICATION FILED AUG. 25, 1920.

1,358,819.

Patented Nov. 16, 1920.
2 SHEETS—SHEET 1.

Inventor.
Thomas A. Bowers
by Heard Smith & Tennant.
Attys.

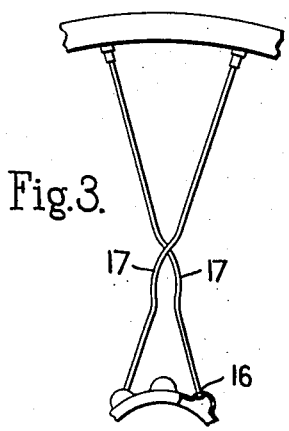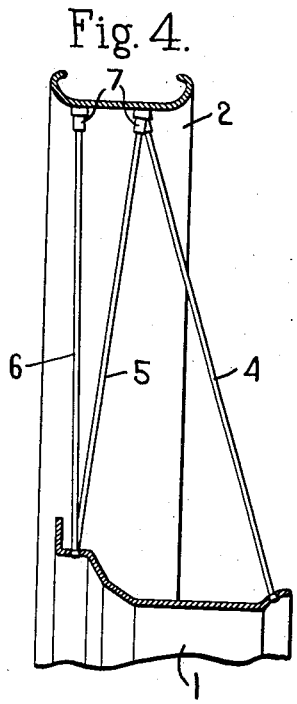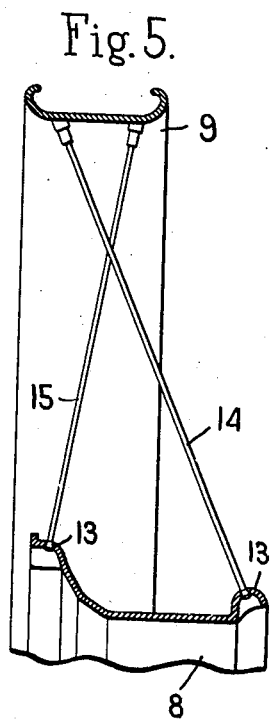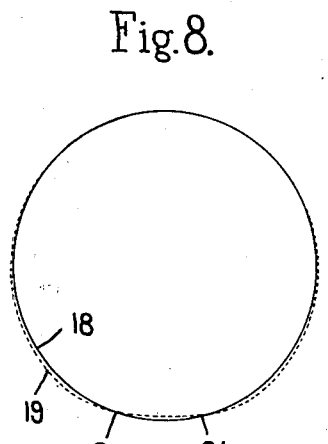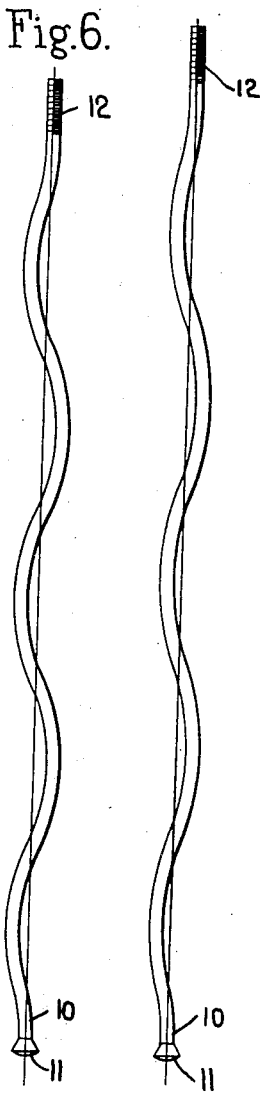

UNITED STATES PATENT OFFICE.

THOMAS A. BOWERS, OF BOSTON, MASSACHUSETTS.

WIRE WHEEL.

1,358,819.  Specification of Letters Patent.  Patented Nov. 16, 1920.

Application filed August 25, 1920. Serial No. 405,876.

*To all whom it may concern:*

Be it known that I, THOMAS A. BOWERS, a citizen of the United States, residing at Boston, county of Suffolk, State of Massachusetts, have invented an Improvement in Wire Wheels, of which the following description, in connection with the accompanying drawing, is a specification, like characters on the drawing representing like parts.
This invention relates to wire vehicle wheels and more particularly to wire wheels for automobiles.

The principal object of the invention is to produce a resilient wire wheel in which the resiliency is secured by the use of a resilient rim and longitudinally resilient crimped spokes laced in position under tension.

The advantages of such a construction are that the resiliency of the wheel causes the vehicle to ride easily; the spokes remain tight under all conditions of use; the work of lacing the wheel is simplified; the securing of a substantially uniform tension in each of the spokes is rendered certain; and the load on the wheel under all conditions is substantially uniformly distributed throughout all the spokes.

The object of the invention is further to provide a construction in which when straight headed spokes are employed the spokes are locked against undesired or accidental turning.

The object of the invention is further more specifically to provide a resilient wheel in which the crimped spokes when laced in position are all under sufficient tension materially to reduce the original crimp in the spokes and thus to permit the spokes to remain under tension during such distortion of the wheel as takes place when in use.

These and other objects and features of the invention will appear more fully from the accompanying description and drawings and will be particularly pointed out in the claims.

In the drawings:

Fig. 3 is a side view of a portion of another form of wheel in which the spokes are provided with a single crimp and with straight heads.

Fig. 4 is a view in vertical cross section of the construction shown in Fig. 1.

Fig. 5 is a view in vertical cross section of the construction shown in Fig. 2.

Fig. 6 is a side elevation of a single spoke of the form shown in Fig. 2 and before it is laced in place.

Fig. 7 is a side elevation of a spoke such as is shown in Fig. 6 illustrating the form which it takes when laced into the wheel under sufficient tension materially to reduce the original crimp.

Fig. 8 is a diagrammatic view to illustrate the change in the shape of the resilient wire wheel under a load.

Figure 1:
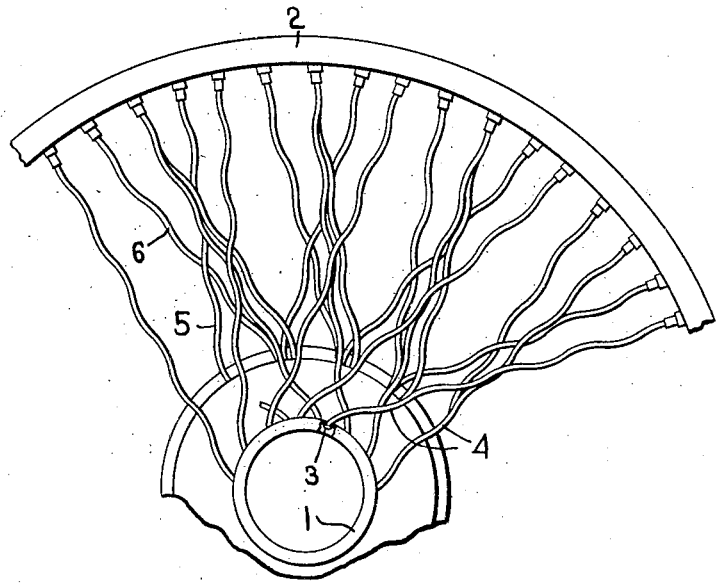
Figure 1 is a side elevation of a portion of a resilient wire wheel embodying the invention in which the spokes are provided with a terminal arch and arranged in three annular rows.

A resilient wheel embodying this invention may take various forms types of which are illustrated in the drawings. Referring to Figs. 1 and 4 such a wheel comprises a hub 1 of usual rigid construction and a rim 2. The rim in this case is of metal and shaped to receive and hold in any suitable manner a tire such as the familiar pneumatic tire. This rim is of sufficient resiliency when separate from the wheel to be readily distorted from its circular form by such loads as are normally applied to the wheel. It is of course understood that the resiliency is relatively slight but nevertheless noticeable and sufficient to secure the desired results.

The spokes of the wheel are made in general conformity with the disclosure of my Patent No. 1,347,837, granted July 27, 1920 and in the wheel illustrated in Figs. 1 and 4 embodying the multiplicity of reverse curves shown in Fig. 4 of that patent. The spokes in this form of wheel are shown as having the terminal arch substantially as shown in the said patent and as seen at 3 in the Fig. 1 where a portion of the hub is broken away. These spokes are as usual arranged substantially tangential to the hub. The crimps in the spokes when laced in place lie approximately in the plane of the wheel and in this form are arranged in three annular rows 4, 5 and 6 (see Fig. 4.) At their inner ends the spokes are headed at the inside of the hub and at their outer ends are threaded into nipples 7 mounted in and projecting through the rim.

Figure 2:
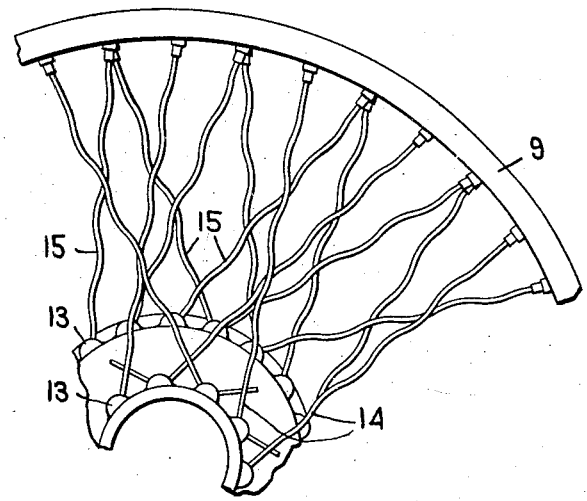
Fig. 2 is a similar view of another form of wheel embodying the invention in which the spokes are provided with straight heads and arranged in two annular rows.

In Figs. 2 and 5 another type of wheel is illustrated in which a similar rigid hub 8 and a similar resilient rim 9 are employed. In this case the spokes have the same general form shown in Fig. 4 of my prior patent but have straight heads, that is, the shank 10 immediately adjacent the head proper 11 extends along the straight axis of the spoke in line with the threaded outer end 12. The spokes are likewise arranged substantially tangential to the hub but the straight heads project through semi-spherical bosses 13 on the hub so that the tension is exerted directly along the main axis of the spoke. In this case the spokes are arranged in two annular rows 14 and 15 between the hub and the rim.

In Fig. 3 a simple form of the invention is illustrated in which but one annular row of spokes is shown and in which the spokes are provided with straight heads 16 and have but a single crimp 17.

The drawings simply illustrate some of the various forms which the invention may take but the number of rows of spokes, the particular shape of the headed end whether straight or curved and the precise form of the crimp and the number and position of the spokes are not involved otherwise than as required by the claims.

In each case the crimped spokes are laced in position connecting the hub and rim in the usual manner and then the nipples are tured up or adjusted by suitable means and in any proper manner until the wheel is true, that is, until the rim and the hub are concentric with the central axis of the wheel and in accordance with this invention until sufficient tension is imposed upon the spokes materially to reduce the original crimp in the spokes. One of the preferred forms of the spoke is illustrated in Fig. 6 in its natural crimped condition. After the wheel has been laced up and the spokes placed under tension all the spokes are lengthened out so as materially to reduce this crimp in the spokes and bring each spoke into a condition such as illustrated in Fig. 7 where the original crimp, as will be seen, is materially reduced.

It will thus be seen that in all cases the completed laced wheel presents a structure in which the rim is resilient and in which all of the spokes are under a very considerable tension. This tension is sufficient not only materially to reduce the original crimp but also sufficient to maintain the spokes under tension when the wheel is distorted by the loads to which it is subjected when in use. This is due to the fact that with the spokes laced up under tension when a distortion of the resilient wheel takes place under the load a few of the spokes are shortened and the majority are lengthened. The crimp remaining in the spokes is sufficient to permit the lengthening of the majority of the spokes and the shortening of the minority without in either case entirely relieving any of the spokes of tension. In the former case a slightly greater tension is or may be imparted to the spokes while in the latter case a slightly lesser tension is or may be imparted to the spokes but in neither case is any of the spokes entirely relieved of tension. This may be understood by referring to the diagram of Fig. 8. This diagram is not intended accurately to represent the exact condition but is to be taken as illustrative. The full line circle 18 represents the rim of a true wheel embodying the invention. When a load is applied to the wheel a slight distortion of the wheel takes place depending upon the amount and the suddenness with which the load is applied. This distortion causes the rim to take more or less of the form indicated by the dotted line 19 which it will be seen crosses the full line 18 at two points 20 and 21. The spokes extending to the hub between the points 20 and 21 at the bottom will be somewhat shortened and the remainder or the majority of the spokes will probably all be somewhat lengthened. In this invention the spokes when laced up in the completed wheel are placed under such tension and so lengthened as partially to remove the original crimp and so that when any such distortion of the wheel takes place the spokes at the bottom between the points 20 and 21 will not be shortened sufficiently to restore the wheel to its original crimped condition and so that these spokes will still remain under some tension. The remainder of the spokes will not be lengthened sufficiently to remove all the crimp remaining in the spokes so that no strain will be brought on these spokes sufficient to break or overload them.

The result is that for the purpose of the wheel a substantially uniform tension is impressed upon all the spokes under all conditions. Consequently also any load imposed upon the wheel is substantially uniformly distributed throughout the spokes. There is thus presented a resilient wheel which may be readily and easily laced up without danger of over-loading any spoke or bringing it to a condition where there is danger of it breaking because the condition of the spoke can be seen and the amount of tension applied can be judged by the appearance of the spoke itself.

An additional feature of the invention resides in that with the crimped spoke having a straight head as shown in Figs. 2, 3, and 5. The arrangement of the spokes prevents the spoke from being loosened by accidental or unintentional rotation. It will be seen that in Fig. 2 each spoke in each row has a crimped portion crossing a crimped portion of another spoke in the same row and that the same is true in Fig. 3. Consequently when these spokes are laced up these crossed crimped portions prevent accidental or unintentional rotation of the spokes.

Having thus described my invention what I claim as new and desire to secure by Letters Patent is—

1. A resilient wire vehicle wheel comprising a hub, a rim of sufficient resiliency when separate from the wheel to be readily distorted from its circular form by normal loads, a plurality of crimped wire spokes extending substantially tangential to the hub and arranged in a plurality of annular rows connecting the hub and rim, the wheel when assembled having the spokes under sufficient tension materially to reduce the original crimp in the spokes and thus to permit the spokes to remain under tension during such distortion of the wheel as takes place when in use.

2. A resilient wire vehicle wheel comprising a hub, a rim of sufficient resiliency when separate from the wheel to be readily distorted from its circular form by normal loads, a plurality of crimped wire spokes having straight inner ends extending substantially tangential to and into the hub and arranged in a plurality of annular rows connecting the hub and rim, each spoke in each row at its crimped portion crossing and in such proximity to the crimped portion of another spoke in the same row as to lock the spokes against accidental turning, the wheel when assembled having the spokes under sufficient tension materially to reduce the original crimp in the spokes and thus to permit the spokes to remain under tension during such distortion of the wheel as takes place when in use.

3. In a resilient wire vehicle wheel comprising a hub, a rim of sufficient resiliency when separate from the wheel to be readily distorted from its circular form by normal loads, a plurality of wire spokes formed with a plurality of uniform short reverse crimps and extending substantially tangential to the hub and arranged in a plurality of annular rows connecting the hub and rim, the wheel when assembled having the spokes under sufficient tension materially to reduce the original crimp in the spokes and thus to permit the spokes to remain under tension during such distortion of the wheel as takes place when in use.

In testimony whereof I have signed my name to this specification.

THOMAS A. BOWERS.